Patented Aug. 2, 1949

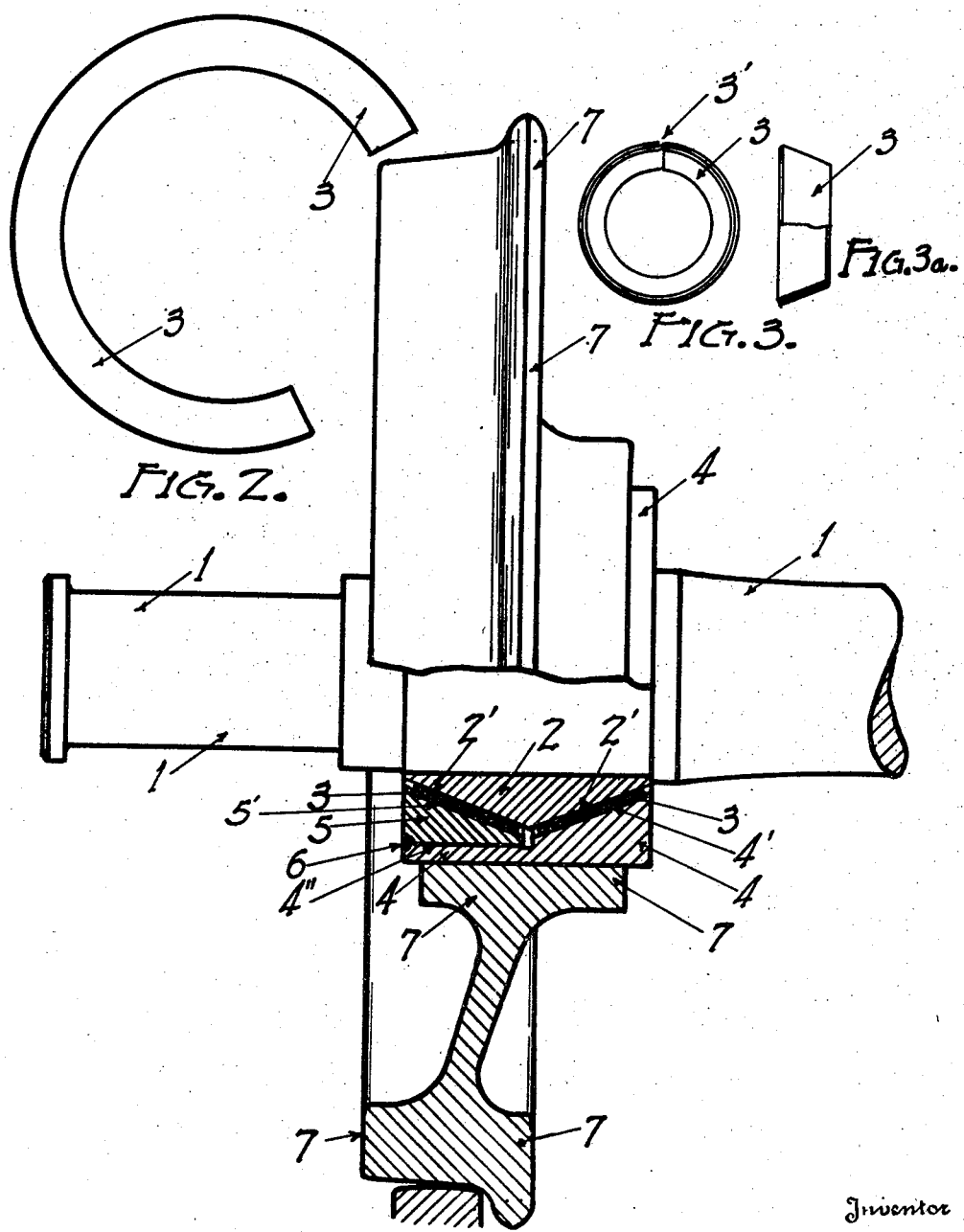

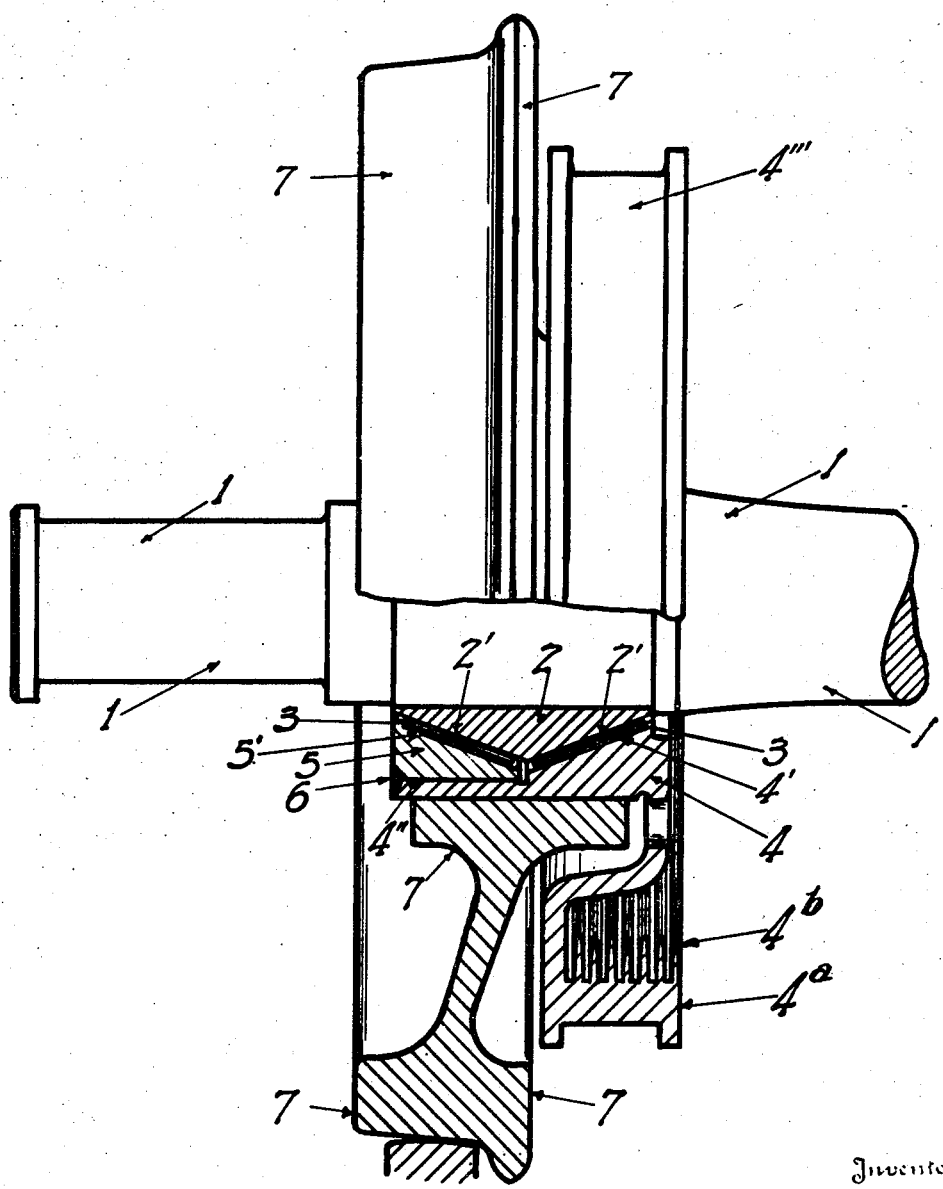

2,477,874

UNITED STATES PATENT OFFICE 2,477,874

RESILIENT CAR WHEEL

Edwin B. Hudson, Middletown, Ohio, assignor to Armco Steel Corporation, a corporation of Ohio Application January 27, 1945, Serial No. 574,890

7 Claims. (Cl. 295—11)

My invention relates to improvements in car wheels for railroads, street railways and the like. In this field the usual construction is a cast or forged steel car wheel mounted directly upon an axle. It has hitherto been suggested that resilient material, such as rubber, gutta-percha and the like, be inserted between the car wheel and the axle. Other suggestions have involved the use of rubber discs loaded in shear. The principal object of these suggestions was the provision of a structure by means of which the vibration and shock caused by the wheels running over rail joints, frogs and crossings would be prevented in some measure at least from reaching the trucks and the car body. Thus noise and discomfort on passenger trains could be reduced as well as damage to the contents of freight cars.

Difficulties have, however, developed in connection with these prior art suggestions. Where rubber or similar material was interposed between the car wheel and the axle, eccentricity tended to develop in the wheel and sometimes reached such large dimensions, say, one-quarter to three-eighths of an inch, that the use of the wheel was rendered impracticable. Certain designs also employed fastenings, such as screws and bolt connections; and these presented a hazard on high speed trains.

The principal object of my invention is the elimination of the difficulties hitherto encountered in the provision of so-called resilient wheels. I have found that these difficulties may be avoided by preloading the resilient material to limit its resiliency.

An object of my invention is the provision of a structure including means to preload the resilient material properly without the use of fastenings such as nuts and bolts.

An object of my invention is the provision of structural improvements in resilient wheels, as will hereinafter be set forth.

Yet another object of the invention is the provision of a structure in which the resilient means are incorporated within a hub which may remain as an assembled part of the car axle when the wheel is replaced.

These and other objects of my invention, which will be set forth hereinafter or will be apparent to one skilled in the art upon reading these specifications, I accomplish by that construction and arrangement of parts, of which I shall now describe certain exemplary embodiments, reference being made to the accompanying drawings wherein:

Figure 1 is a view partly in elevation and partly in section showing a structure embodying my invention.

Figure 2 is an elevational view of a piece of resilient material cut from flat stock before forming.

Figure 3 is an end elevational view of a formed conical bushing of resilient character.

Figure 3a is a side elevation of the same bushing with a part shown in section.

Figure 4 is a view partly in elevation and partly in section of a wheel structure for high speed trains including a brake drum.

The nature of the resilient or impact absorbing material which I employ is not a limitation upon the invention. The material preferred by me is a sheet-like material comprising layers of closely woven, light weight cotton duck formed of tightly twisted threads. Each layer is thoroughly impregnated with a rubber compound, and the layers are vulcanized together. This material is described in United States Letters Patent 2,009,059, and I employ it in connection with the exemplary embodiments herein described.

Other substances, which are resilient in the common sense, may likewise be employed and do not require description. Still other materials, not usually thought of as resilient in the same sense, have the property of absorbing shock and high frequency vibrations to a useful degree because they have a lower modulus of elasticity than steel. Among such materials are babbitt, zinc and brass. It will be understood that the use of such materials is less effective than the employment of my preferred materials, but they are useful in reducing shock and providing some protection especially to roller bearings where these are employed.

Referring to Figure 1, I have shown a car axle I of usual form. As a part of my construction, the axle is fitted with a metallic bushing 2, having outwardly and oppositely disposed conical slopes 2'. The bushing is press fitted or otherwise fastened to the axle. The conical slopes 2' engage respectively conical pieces or assemblies of resilient material, indicated in the drawings at 3.

One way of providing the resilient bushings 3 is illustrated in Figures 2, 3 and 3a. Using my preferred material, I may cut a semi-circular strip thereof and wind it into a conical shape of two layers as illustrated, or of more or fewer layers as desired. The resilient bushings may, of course, be otherwise formed, especially when made of different materials, as will be clear. Two of the resilient bushings 3 are used for each wheel in my construction.

I then provide an external metal bushing 4, one end of which has a conical bore marked 4' which engages one of the resilient bushings. The other end of the bushing has a straight or cylindrical bore marked 4". A third metallic bushing is indicated at 5. Its external surface is cylindrical and dimensioned to pass within the cylindrical bore 4" of the bushing 4. The inside surface of the bushing 5 is conical in shape and engages the surface of the other resilient bushing 3.

These several bushings are assembled as shown and by hydraulic pressure, the bushing 5 is pressed into position within the bushing 4 and then is welded to the bushing 4, as at 6.

By properly dimensioning the bushing parts 2, 3, 4 and 5, the resilient material 3 may be preloaded to any desired value by the pressure exerted in assembly, as described; and the weld 6 fixes the position of the parts, making the preloading permanent.

The axle bore of the member 2 may be so proportioned as to meet the standard fit specifications now used for wheel-axle fits. I have found it desirable, however, to increase the interference dimensions between the axle 1 and the bushing 2 over the present practice, since in my structure, the life of the resilient hub assembly which I have described, is longer than the life of the wheel itself, as determined by tread wear. Hence, the hub structure need not be removed from the axle when wheels are changed.

Where the resilient material is formed into a bushing, as described, I prefer to form the bushing of two or more complete wraps or layers, vulcanizing the layers together to form the conical bushing. The resilient bushings may likewise with advantage be vulcanized to the bushings 2, 4 and 5, which may be done after the assembly and preloading of the structure, as described.

The bushings 3 are formed in a cone shape so as to resist both axial and radial loads, and the angle of the slope is preferably proportioned to the relative values of these loads. The conical surfaces of the several metal bushings accomplish the preloading by a wedging action, as will be clear. The entire hub structure may be assembled as a unit, and the internal and outside surfaces of the hub machined to the desired dimensions after the hub is assembled. The press fitting of the hub on the car axle will thus increase the loading of the resilient material.

A cast or forged steel car wheel 7 of conventional type having a hub, a plate and a rim but with the hub dimensioned to accept the resilient hub described above will be press fitted upon the resilient hub in the usual way. This, again, increases the preloading of the resilient material.

Figure 4 shows a wheel assembly for high speed trains. The axle, resilient hub and wheel are essentially the same as has been described above. On high speed trains, however, where excessive braking is likely to occur and to cause undue heating of the tread of the wheel, I prefer to provide a separate brake drum and to apply the brake shoes to it rather than to the tread of the wheel. In Figure 4, I have shown the metal bushing 4 extended and flanged to provide a brake drum 4a. Air cooling fins 4b may be provided within the brake drum to prevent the accumulation of heat. It will be noted of this structure that the braking force is transmitted directly to the wheel 7 through the bushing 4 without passing through the resilient material 3.

Modifications may be made in my invention without departing from the spirit of it. Having thus described my invention in certain exemplary embodiments, what I claim as new and desire to secure by Letters Patent is:

1. A railway car wheel assembly comprising an axle and a wheel each assembled to a separate intermediate hub construction, said hub construction comprising an inner bushing with opposed conical outer surfaces and a pair of outer bushings with opposed conical inner surfaces, shock absorbing material located between respective pairs of conical surfaces, the two outer bushings being fastened together in tension so that the conical surfaces of the respective bushings by wedging action preload the said shock absorbing material located therebetween.

2. A railway car assembly comprising an axle, a wheel and a hub assembly located therebetween, said hub assembly having an inner bushing with a bore accepting said axle, said inner bushing having conical outer surfaces thereon tapering from a central portion toward the ends of said bushing, an outer bushing having a conical bore with an inner tapered surface corresponding to one of the surfaces of the first mentioned bushing and a cylindrical bore extending therebeyond, and an intermediate bushing having an inner conical bore corresponding to the other conical surface of said first mentioned bushing and an outer cylindrical bore capable of passing within the cylindrical bore of said outer bushing, shock absorbing material of conical shape located between respective pairs of conical surfaces of said several bushings, the said outer and intermediate bushings being welded together in tension such that the resilient material is compressed and preloaded by the said conical surfaces.

3. A railway car assembly comprising an axle, a wheel and a hub assembly located therebetween, said hub assembly having an inner bushing with a bore accepting said axle, said inner bushing having conical outer surfaces thereon tapering from a central portion toward the ends of said bushing, an outer bushing having a conical bore with an inner tapered surface corresponding to one of the surfaces of the first mentioned bushing and a cylindrical bore extending therebeyond, and an intermediate bushing having an inner conical bore corresponding to the other conical surface of said first mentioned bushing and an outer cylindrical bore capable of passing within the cylindrical bore of said outer bushing, shock absorbing material of conical shape located between respective pairs of conical surfaces of said several bushings, the said outer and intermediate bushings being welded together in tension such that the resilient material is compressed and preloaded by the said conical surfaces, the slope of the said conical surfaces being proportioned to the radial and thrust loads expected in service.

4. A railway car assembly comprising an axle, a wheel and a hub assembly located therebetween, said hub assembly having an inner bushing with a bore accepting said axle, said inner bushing having conical outer surfaces thereon tapering from a central portion toward the ends of said bushing, an outer bushing having a conical bore with an inner tapered surface corresponding to one of the surfaces of the first mentioned bushing and a cylindrical bore extending therebeyond, and an intermediate bushing having an inner conical bore corresponding to the other conical surface of said first mentioned bushing and an outer cylindrical bore capable of passing within the cylindrical bore of said outer bushing, shock absorbing material of conical shape located between respective pairs of conical surfaces of said several bushings, the said outer and intermediate bushings being welded together in tension such that the resilient material is compressed and preloaded by the said conical surfaces, said outer bushing having an annular and radial extension thereon forming a brake drum.

5. In resilient car wheel construction a separate hub structure comprising opposed, hollow, conical members of shock absorbing material and means for preloading said shock absorbing material comprising an inner bushing having external opposed conical surfaces upon which said resilient material is located, and outer bushings having respectively opposed conical surfaces lying against said resilient material, said outer bushings being permanently fastened together in tension so as to exert by means of their conical surfaces a strong, compressive force upon said resilient material whereby to preload it.

6. A resilient hub for the purpose described, comprising an inner bushing having a bore and opposed conical outer surfaces tapering from a thicker central portion to thinner edge portions, an external bushing of at least the same length having a conical bore at one end providing a surface opposed to one of the conical surfaces of the first mentioned bushing and a non-conical bore at the other end, and an intermediate bushing having an external surface to pass within the non-conical bore of said outer bushing and an inner conical surface to match the other conical surface of said inner bushing, shock absorbing material of conical shape being disposed between the respective pairs of conical surfaces, the said outer and intermediate bushings being compressed toward each other so as to preload said resilient material by a wedging action and being welded together to make said preloading permanent.

7. A resilient hub for the purpose described, comprising an inner bushing having a bore and opposed conical outer surfaces tapering from a thicker central portion to thinner edge portions, an external bushing of at least the same length having a conical bore at one end providing a surface opposed to one of the conical surfaces of the first mentioned bushing and a non-conical bore at the other end, and an intermediate bushing having an external surface to pass within the non-conical bore of said outer bushing and an inner conical surface to match the other conical surface of said inner bushing, shock absorbing material of conical shape being disposed between the respective pairs of conical surfaces, the said outer and intermediate bushings being compressed toward each other so as to preload said resilient material by a wedging action and being welded together to make said preloading permanent, said outer bushing having a radial extension providing a brake drum whereby braking stresses may be applied directly to a wheel mounted on said outer bushing without passing through said shock absorbing material.

EDWIN B. HUDSON.

REFERENCES CITED

The following references are of record in the file of this patent:

UNITED STATES PATENTS

| Number | Name | Date |
| --- | --- | --- |
| 623,883 | Cameron | Apr. 25, 1899 |
| 1,424,203 | Keller | Aug. 1, 1922 |
| 2,049,374 | Harter | July 28, 1936 |
| 2,255,023 | Eksergian | Sept. 2, 1941 |